(No Model.)
E. D. SCHMITT.
FRICTION CLUTCH.
No. 465,213. Patented Dec. 15, 1891.
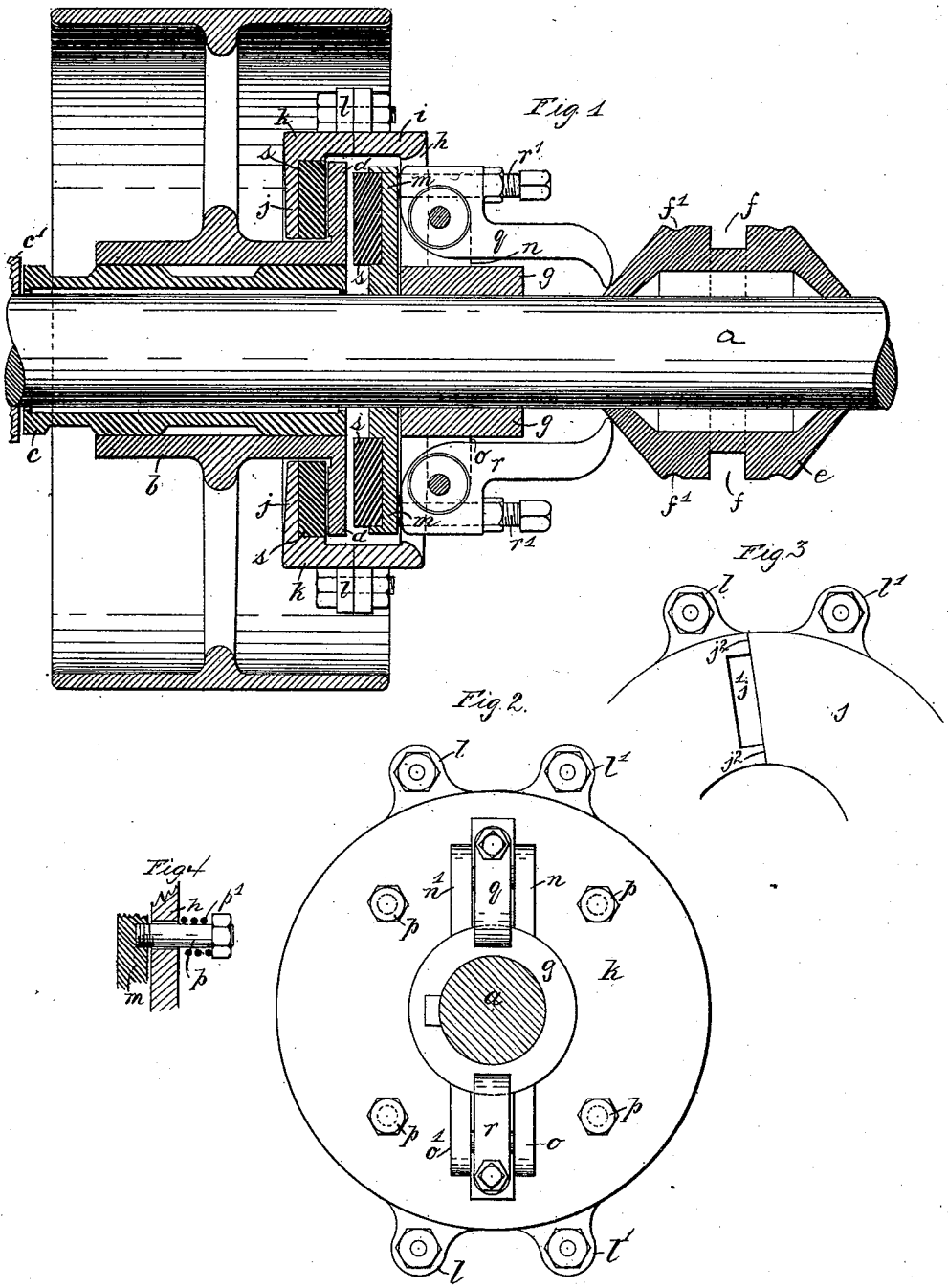
Witnesses
V. T. Wilson
Fred S. Kemper
Inventor
Edward D. Schmitt
By his Attorneys
Gifford & Saw
THE NORRIS PETERS CO., PHOTO-LITHO., WASHINGTON, D. C.

UNITED STATES PATENT OFFICE.

EDWARD D. SCHMITT, OF CUYAHOGA FALLS, OHIO, ASSIGNOR TO THE FALLS RIVET AND MACHINE COMPANY, OF OHIO.

FRICTION-CLUTCH.

SPECIFICATION forming part of Letters Patent No. 465,213, dated December 15, 1891.

Application filed October 20, 1891. Serial No. 409,288. (No model.)

*To all whom it may concern:*

Be it known that I, EDWARD D. SCHMITT, of Cuyahoga Falls, in the State of Ohio, have invented a new and useful Improvement in Friction-Clutches, of which the following is a specification.

Figure 1 of the accompanying drawings is a longitudinal section of a clutch-pulley containing my invention. Fig. 2 is an end view of the same with the shifting sleeve omitted. Figs. 3 and 4 are details.

$a$ is the shaft; $b$, the pulley-hub; $c$, the bushing of the pulley-hub; $d$, a circular flange extending radially outward from one end of the pulley-hub; $e$, the ordinary shifting sleeve, provided with the ordinary groove $f$ for the ordinary shifting-lever, and $c'$ a set collar to hold the pulley in place.

The object of the parts about to be described is by motions received from the shifting sleeve $e$ to frictionally clutch the circular flange $d$ of the pulley.

$g$ is a ring fixed upon the shaft $a$ by any suitable means.

$h$ is a circular flange radiating from the end of the ring $g$ adjacent to the pulley.

$i$ is a circumferential flange extending toward the pulley from the periphery of the flange $h$.

The ring $g$ and the flanges $h$ and $i$ are all cast in one piece.

$j$ is a circular disk which fits loosely around the hub $b$, and which is provided at its periphery with a flange $k$ corresponding with the flange $i$. The disk $j$ is cored out at $j'$, Fig. 3, and is split diametrically on the line $j^2$, so that it may be placed around the hub in two parts, but is secured together and to the flange $i$ when the bolts are applied to the lugs or ears. The flanges $i$ and $k$ are provided with ears $l\ l'$, by which they may be bolted firmly together.

$m$ is a disk which fits around the shaft $a$ inside of the flange $i$, and which is free to move longitudinally on the shaft $a$, but is firmly held from rotating thereon and on the flange $h$ by any suitable means, such as pins $p$, projecting, as shown in Fig. 4, loosely through holes in the flange $h$ and tapped into the disk $m$. The disk $m$ is yieldingly held toward the flange $h$ by coiled springs $p'$, interposed between the heads of bolts $p$ and the plate $h$.

$n\ n'$ and $o\ o'$ are two pairs of lugs cast upon opposite sides of the ring $g$ to receive the journals of the levers $q$ and $r$. These are right-angled levers, as shown, and each is provided at one arm with a set-screw $r'$, the noses of which project through openings cored in the flange $h$ and impinge against the disk $m$. The opposite arms of both levers impinge upon the inclined surface of the shifting sleeve $e$. The disks $m$ and $j$ are each faced with wood $s$ on the surface adjacent to the flange $d$.

The operation of the clutch is as follows: In the drawings it is shown in the unclutched position. As the shifting sleeve $e$ is shifted toward the pulley the arms of levers $q$ and $r$, in contact with the sleeve, will slide up the inclined sleeve until they are locked by entering the groove $f'$. This throws the noses of the set-screws $r'$ forward so as to throw the wood facing of the disk $m$ into contact with the flange $d$. This forces the pulley bodily toward the set-collar $c'$ (which is slightly off from the end of bushing $c$) until the wood facing of the disk $j$ is brought into contact with the flange $d$ on the opposite side.

I claim—

1. In combination with a pulley and the hub thereof, a flange $d$, radiating from the hub, the friction-disks $m$ and $j$ on opposite sides thereof, a sleeve $g$, rotating with the shaft, means whereby the disk $j$ is fixed to the sleeve $g$, and levers mounted on opposite sides of the sleeve $g$, whereby the friction-surfaces on disks $m$ and $j$ are caused to grip the flange $d$ on opposite sides, substantially as described.

2. A gripping device consisting of the disks $m$ and $j$, the levers $q\ r$, the sleeve $g$, upon which the levers are mounted, and the flanges $i\ k$, by which the sleeve $g$ is connected with the periphery of the disk $j$ outside the disk $m$, substantially as described.

3. A clutch device consisting of the disks $m$ and $j$, the sleeve $g$, the levers mounted thereon, the flange $h$, and the divided flange $i\ k$, connecting with the peripheries of the flanges $h$ and $j$ and provided with means whereby its two parts may be detachably secured together, substantially as described.

4. In combination with a pulley and the hub thereof, a flange $d$, radiating from the hub, friction-disks $m$ and $j$ on opposite sides thereof, a flange $h$, rigidly secured to the disk $j$, a spring whereby the disk $m$ is drawn toward the flange $h$, and levers journaled upon the flange $h$, whereby the disk $m$ is thrust toward the flange $d$, substantially as described.

EDWARD D. SCHMITT.

Witnesses:
FRED S. KEMPER,
J. E. GREER.